United States Patent [19]

Sousa

[11] Patent Number: 5,266,836
[45] Date of Patent: Nov. 30, 1993

[54] METHOD AND APPARATUS FOR OPERATING A MOTOR VEHICLE ALTERNATOR

[75] Inventor: Mark D. Sousa, Inkster, Mich.

[73] Assignee: Ford Motor Company, Dearborn, Mich.

[21] Appl. No.: 906,338

[22] Filed: Jun. 30, 1992

[51] Int. Cl.$^5$ .............................. H02P 9/06; H02P 9/00; F02B 67/04

[52] U.S. Cl. ............................. 290/31; 290/22; 322/29

[58] Field of Search ........................... 290/31, 46

[56] References Cited

FOREIGN PATENT DOCUMENTS

2485293 12/1981 France .

Primary Examiner—A. D. Pellinen
Assistant Examiner—Robert Lloyd Hoover
Attorney, Agent, or Firm—Roger L. May; Paul K. Godwin, Jr.

[57] ABSTRACT

The operating speed of a motor vehicle alternator is controlled based on the frequency of power generated by the alternator. Since the frequency of the alternator power is representative of engine speed, the alternator is shifted between a high speed gear train for low engine speeds and a low speed gear train for high engine speeds. When shifting to the high speed gear train, it is only partially engaged for a brief initial time period to more gradually accelerate the alternator armature toward the corresponding high operating speed. Preferably, initial clutch pull-in is sensed to start the partial engagement period of the high speed gear train. The load on the alternator drive during shifts to high speed operation is further reduced by turning the alternator field current off prior to partially engaging the high speed gear train. By turning off the field current and allowing it to decay substantially prior to partially engaging the high speed gear train, the magnetic forces opposing acceleration of the armature are substantially reduced. Preferably, the alternator field current is restored only after the alternator is operating substantially at the high speed and the alternator drive is fully engaged.

11 Claims, 6 Drawing Sheets

METHOD AND APPARATUS FOR OPERATING A MOTOR VEHICLE ALTERNATOR

BACKGROUND OF THE INVENTION

The present invention relates generally to alternators for use in motor vehicles and, more particularly, to a method and apparatus for operating an alternator in a motor vehicle to improve low engine speed power generation and to do so in a compact alternator structure.

A conventional motor vehicle alternator is driven by the vehicle's internal combustion engine at a defined speed change ratio through a drive belt or the like. Unfortunately, the output current and efficiency of the alternator vary with the speed of the engine which is controlled for the mechanical requirements of the vehicle. At low speeds, the alternator output is insufficient to provide the power needed to operate all electrical equipment of the vehicle while at high speeds, power generation is sufficient to far exceed these requirements.

It has been recognized that the operating speed of an alternator used in the electrical system of a motor vehicle may be varied to overcome these inconsistent power generation versus power requirements and to advantageously generate sufficient power for the motor vehicle when the engine is operating at a low speed. For example, a two speed alternator operable at its higher speed for low speed operation of the corresponding motor vehicle engine is known. In the known system, switches between the low and high speeds are performed by a centrifugal switch at a given engine speed.

Another two speed alternator system provides switches between a high speed and a low speed dependent upon detection of idling operation of the driving engine.

Still another alternator speed control arrangement involves an alternator speed changing device which is controlled to maintain operation of an alternator within an optimum predetermined range of operating speeds at all times.

While not related to the problem of providing sufficient power at low operating speed of a driving internal combustion engine, an alternator control system is known which prevents over-speed operation of an alternator. In this system, the frequency of the output power from the alternator is monitored and an alternator drive system is disengaged for frequencies above a given frequency. Hence, operation of the alternator above a given speed is prevented to thereby prevent potential damage to the alternator.

These known alternator control arrangements are useful in providing adequate power at low engine speeds or for protecting alternators at high engine speeds; however, the known alternator control arrangements for providing adequate power at low engine speeds are either mechanically unreliable or require control inputs from an engine speed controller or the like for proper operation.

Accordingly, there is a need for an improved control arrangement for controlling the operation of an alternator in a motor vehicle which is reliable and does not require interconnection to related engine operating components. Preferably, the improved arrangement would permit a compact alternator structure to not only provide adequate power at low engine operating speeds but also occupy less space within the engine compartment.

SUMMARY OF THE INVENTION

This need is met by the method and apparatus of the present invention wherein the output frequency of power generated by an alternator is used to control the operating speed of the alternator. The frequency of output power generated by the alternator is representative of the operating speed of the engine. By using the frequency of the output power generated by the alternator for controlling switching between, a high operating speed for low frequency output power and hence low engine speed and a low speed for high frequency output power, and under high engine speed the alternator control arrangement is autonomous in that it does not rely on external inputs from engine control equipment or otherwise.

Advantageously, when shifting to a first high speed of operation from a second low speed of operation, the alternator control arrangement of the present invention partially engages the alternator drive mechanism for an initial brief period of time. This initial brief period of partial engagement of the alternator drive mechanism somewhat gradually accelerates an armature of the alternator toward the first high operating speed from the second low operating speed.

In the preferred apparatus embodiment of the present invention, a two speed gear train is coupled between a drive pulley and the armature of the alternator. An electrical clutch is provided for switching between the high operating speed and the low operating speed. Preferably, the partial engagement period of the drive mechanism commences upon sensing initial clutch pull-in which ensures partial engagement of the clutch for the noted gradual acceleration of the armature. Gradual acceleration of the armature toward the high operating speed is accomplished by partially engaging the electrical clutch for a clutch slip time period prior to fully engaging the clutch.

The shift load on the gear train and electrical clutch can be reduced further in accordance with the present invention by turning the alternator field current of the armature off prior to partially engaging the electrical clutch. By turning off the field current of the armature and allowing it to decay substantially prior to partially engaging the electrical clutch, the magnetic forces opposing acceleration of the armature toward the first high operating speed are substantially reduced. Preferably, the alternator field current of the armature is restored only after the alternator is fully operating at the first high speed and the electrical clutch is fully engaged.

In accordance with one aspect of the present invention, a method of operating a two speed alternator having a stator and an armature comprises the steps of: monitoring the frequency of electrical energy generated by the alternator; operating the alternator at a first speed of its two speeds for frequencies of electrical energy ranging from zero up to a first predefined frequency; and, operating the alternator at a second speed of its two speeds for frequencies of electrical energy from a maximum frequency down to a second predefined frequency, the second speed being less than the first speed.

In accordance with another aspect of the present invention, an alternator driven by an internal combustion engine of a motor vehicle comprises an alternator housing having stator circuit means therein for conducting electrical energy from the alternator. Armature circuit means are mounted for rotation within the housing with drive means provided for transmitting energy from the internal combustion engine to the alternator. Gear means are connected between the drive means and the armature circuit means for driving the armature circuit means at two speeds defined by the gear means. Clutch means are connected to the gear means for switching between the two speeds. Circuit means connected to the stator circuit means monitor the frequency of electrical energy generated by the alternator and control the clutch means to switch between the two speeds of the gear means dependent on the frequency of electrical energy generated by the alternator.

It is thus a feature of the present invention to provide an improved method and apparatus for controlling an alternator of a motor vehicle to switch between a first high speed of operation for low vehicle engine speeds and a second low speed of operation for high vehicle engine speeds based on the frequency of power generated by the alternator; to provide an improved method and apparatus for controlling an alternator of a motor vehicle to switch between a first high speed of operation for low vehicle engine speeds and a second low speed of operation for high vehicle engine speeds based on the frequency of power generated by the alternator wherein a clutch is used to select between the speeds and is initially slipped to reduce stress on the alternator drive train as the alternator is switched from low to high speed operation; and, to provide an improved method and apparatus for controlling an alternator of a motor vehicle to switch between a first high speed of operation for low vehicle engine speeds and a second low speed of operation for high vehicle engine speeds based on the frequency of power generated by the alternator wherein alternator field current is interrupted prior to performing a low to high speed switch to reduce stress on the alternator drive train.

DETAILED DESCRIPTION OF THE INVENTION

Figure 1:
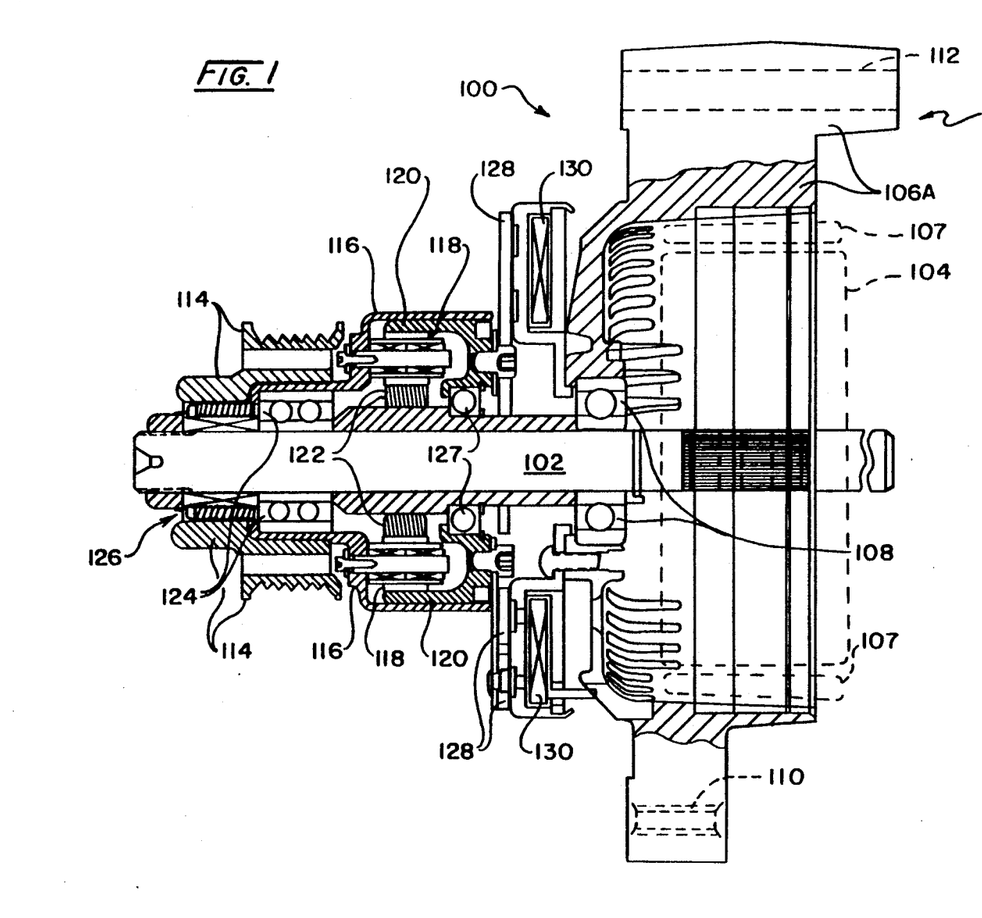
FIG. 1 is a partially sectioned side view of a two speed drive arrangement for an alternator.

FIG. 1 illustrates a two speed drive arrangement for a motor vehicle alternator 100. Only the forward or drive portion of the alternator 100 has been shown for ease of illustration and description. An alternator drive shaft 102 supports armature circuit means comprising an armature 104 and is in turn supported for rotation in a front half-shell 106A of an alternator housing 106 by front bearings 108. Stator circuit means comprising a wye connected stator winding 107 is supported about the inner periphery of the alternator housing 106 (also see 107A in FIG. 5). The alternator 100 is mounted to be driven by an associated engine by means of bolt receiving passages 110 and 112.

Drive means for transmitting energy from the motor vehicle engine comprises a pulley 114. The pulley 114 is mounted to the alternator drive shaft 102 by means of gear means comprising a planetary gear housing 116, planetary gears 118, a ring gear 120 and a star gear 122 which is secured to the alternator drive shaft 102. The pulley 114 and planetary gear housing 116 are secured to one another and mounted to the outer end of the alternator drive shaft 102 by bearings 124 and a one way roller clutch 126. The ring gear 120 is mounted for rotation relative to the alternator drive shaft 102 by bearings 127 and also secured to a clutch plate 128 which interfaces with and is controlled by clutch means comprising an electrical clutch 130. This structure provides a two speed drive arrangement for the alternator 100.

Operation of the two speed drive arrangement illustrated in FIG. I will now be described. When the electrical clutch 130 is engaged or operated, the clutch plate 128 is secured relative to the housing of the alternator 100 which in turn secures the ring gear 120 such that it does not rotate relative to the alternator drive shaft 102. The planetary gears 118 move with the planetary gear housing 116 and are caused to rotate as they engage the secured ring gear 120. The rotating planetary gears 118, which are engaged with the star gear 122, then cause the star gear 122 and the alternator drive shaft 102 to rotate. Accordingly, the alternator drive shaft 102 is driven through the pulley 114, the planetary gear housing 116, the planetary gears 118 and the star gear 122.

Due to the action of the planetary gear drive, the alternator drive shaft 102 is driven at a first high speed which is higher than the speed which would result if the alternator drive shaft 102 was directly driven by the pulley 114. The alternator drive shaft 102 is able to rotate faster than the pulley 114 because of the one way roller clutch 126 which permits free rotation of the alternator drive shaft 102 at such higher speeds.

When the electrical clutch 130 is disengaged or not operated, the clutch plate 128 and ring gear 120 are free to rotate relative to the alternator drive shaft 102. Accordingly, the alternator drive shaft 102 is driven by the pulley 114 through the one way roller clutch 126 at a second low speed determined by a drive pulley/belt (not shown) coupling the internal combustion engine of the motor vehicle to the pulley 114 of the alternator 100. Thus, the alternator 100 can be driven at the first high speed by operating the electrical clutch 130 and can be operated at the second low speed by releasing the electrical clutch 130.

While the above described two speed drive arrangement for an alternator of a motor vehicle is very similar to known two speed drive arrangements, the invention of the present application provides an improved arrangement for controlling the two speed operation of an alternator in a motor vehicle which control arrangement is reliable and does not require interconnection to related engine operating components. The improved control arrangement also permits a more compact alternator structure by reducing the stress imposed on the two speed drive arrangement such that the alternator can occupy less space within the engine compartment of a motor vehicle.

Figure 2:
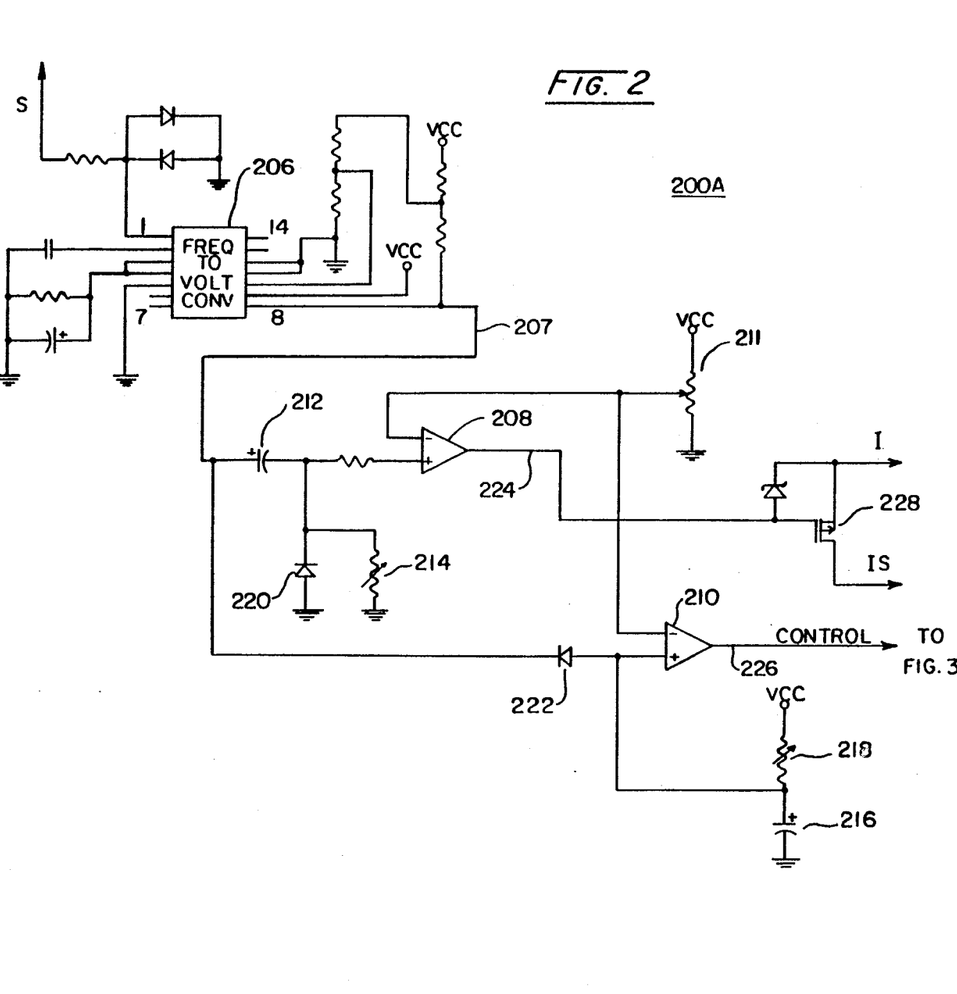
FIGS. 2 and 3 together form a schematic diagram for a clutch control circuit for controlling the two speed alternator drive arrangement of FIG. 1.
Figure 3:
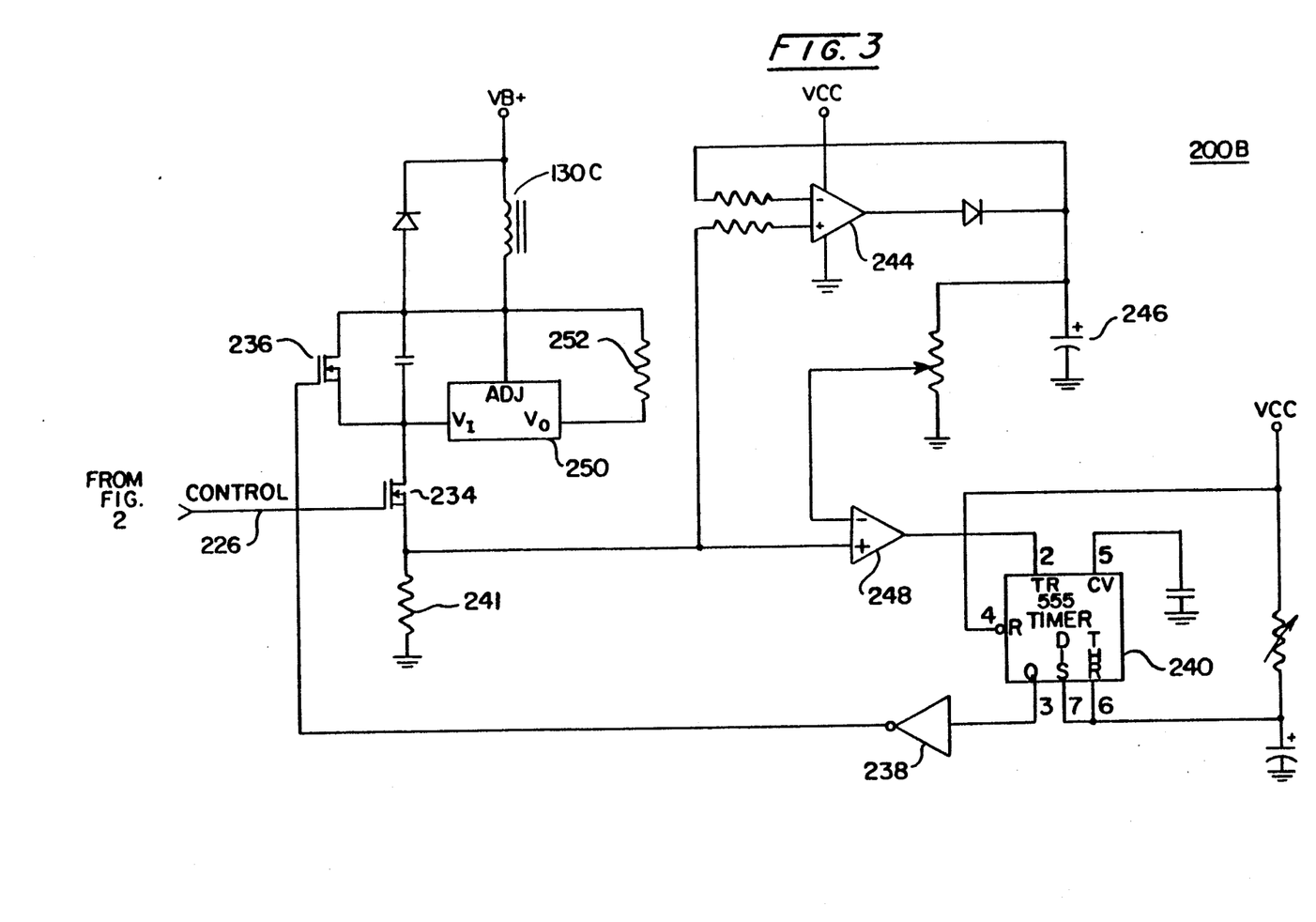
Figure 5:
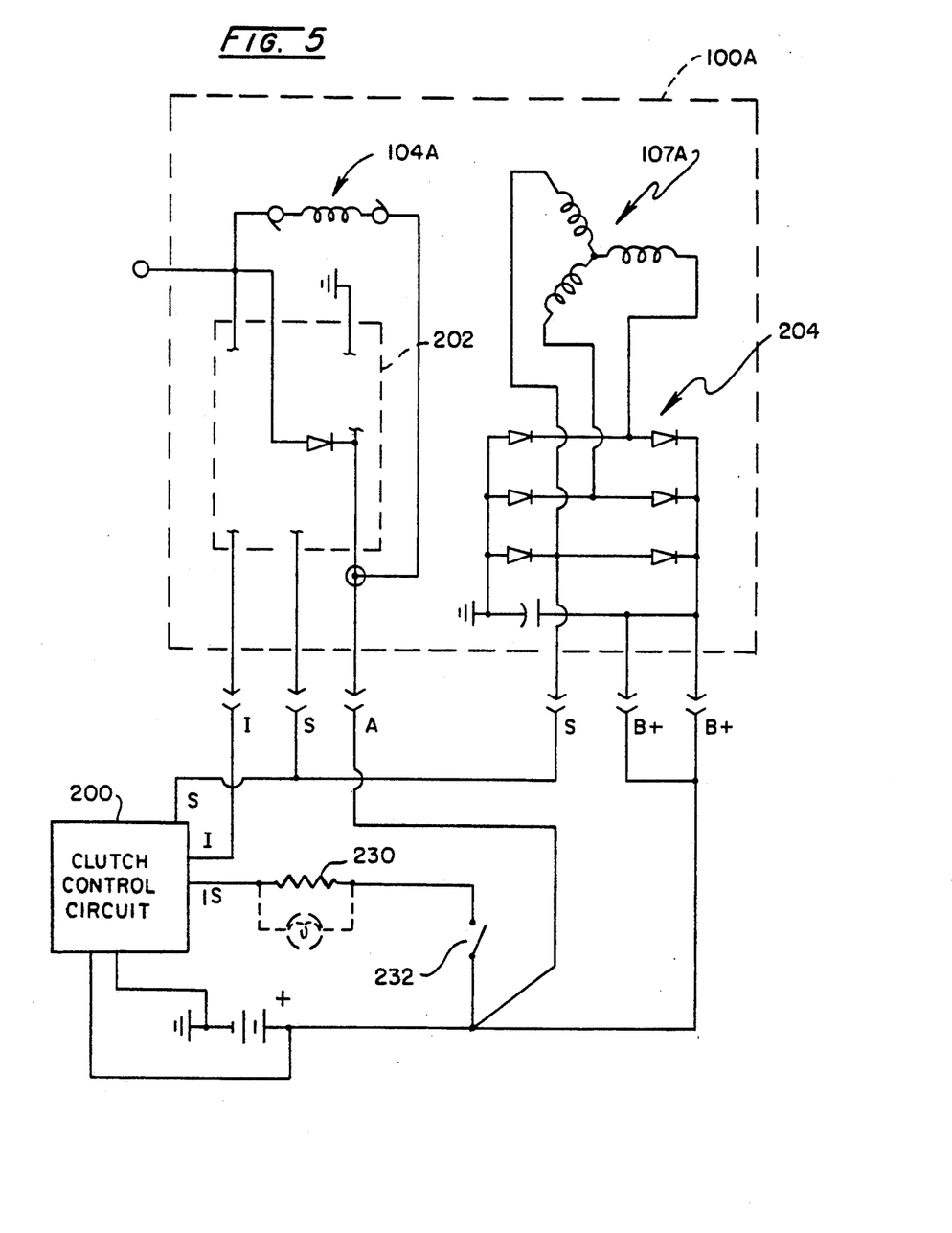
FIG. 5 is a schematic diagram of a two speed alternator circuit connected for control in accordance with the present invention by the clutch control circuit of FIGS. 2 and 3; and, FIGS. 6A-6F are timing plots which compare signals generated by the clutch control circuit of FIGS. 2 and 3.

Reference will now be made to FIGS. 2 and 3 which together form a schematic diagram for a clutch control circuit 200 for controlling the two speed alternator drive arrangement of FIG. 1 in accordance with the present invention wherein the output frequency of power generated by the alternator 100 is used to switch between the high and low operating speeds of the alternator 100. In FIG. 5, the clutch control circuit 200 of FIGS. 2 and 3 is shown connected to an alternator 100A with conventional circuitry including stator circuit means comprising a stator circuit 107A, armature circuit means comprising an armature circuit 104A and an integral alternator regulator 202.

As shown in FIGS. 2 and 5, one of the stator circuit windings is monitored by connection to a stator or S lead coming from a rectifier assembly 204 of the alternator 100A. An output signal on the S lead is connected to the input of a frequency to voltage converter 206. In the illustrated embodiment, the frequency to voltage converter 206 is a LM2907, which is commercially available from National Semiconductor, although other commercially available devices and circuits can be used in the present invention.

The frequency to voltage converter 206 is configured in a known manner as shown to provide a high output voltage for signals ranging in frequency from dc up to approximately 510 hertz at which point the output voltage is switched to a low output voltage, in this case substantially ground potential. The output voltage from the frequency to voltage converter 206 remains at a low voltage level for signals having frequencies above 510 hertz and frequencies from 510 hertz down to approximately 180 hertz. Thus, the frequency to voltage converter 206 has a hysteresis band between approximately 180 hertz and 510 hertz.

Figure 4:
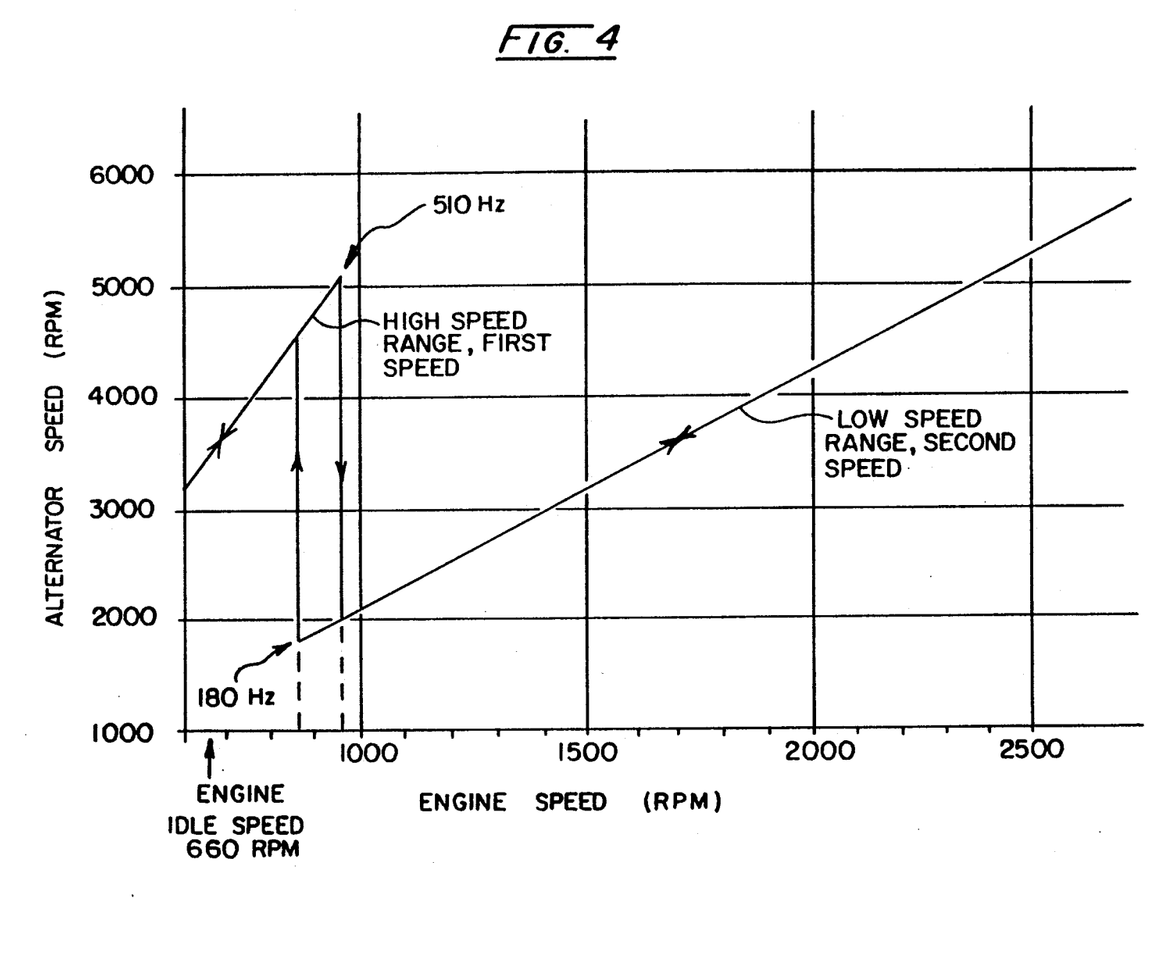
FIG. 4 is a graph showing alternator operating speed versus engine operating speed for an alternator operated in accordance with the present invention.

As shown in FIG. 4, in the illustrated embodiment of the present invention just prior to switching with alternator operation in the low speed range, the 180 hertz switch point corresponds to an alternator speed of approximately 1800 revolutions per minute (RPM) and an engine speed of approximately 850 RPM. Similarly, just prior to switching with alternator operation in the high speed range, the 510 hertz switch point corresponds to an alternator speed of approximately 5100 RPM and an engine speed of approximately 950 RPM. Accordingly, the hysteresis band in terms of engine speed in the illustrated embodiment is between 850 and 950 RPM with nominal engine idle speed being approximately 660 RPM.

Figure 6A:
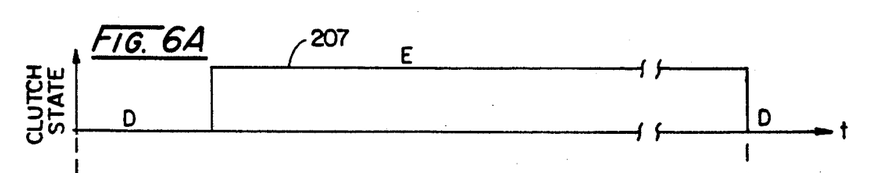

The output signal 207 from the frequency to voltage converter 206 indicates whether the electrical clutch 130 should be operated or released: if the output signal 207 is at its high voltage level, the electrical clutch should be operated; if the output signal 207 is at its low voltage level, the electrical clutch should be released, see FIG. 6A. To this end, the output signal 207 from the frequency to voltage converter 206 is passed to a pair of comparator circuits 208 and 210 which are connected to a potentiometer 211 for selection of a reference voltage. The comparator circuits 208 and 210 have associated RC time constant circuits which control their operation as the output signal 207 from the frequency to voltage converter 206 transitions from its low voltage level to its high voltage level.

The RC time constant circuit for the comparator 208 comprises a capacitor 212 and potentiometer 214 which permits its time constant to be selected as desired. The RC time constant for the comparator 210 comprises a capacitor 216 and a potentiometer 218 which permits its time constant to be selected as desired. The capacitors 212 and 216 are rapidly discharged through diodes 220 and 222, respectively, when the output signal 207 from the frequency to voltage converter 206 goes from its high voltage level to its low voltage level or ground potential.

Figure 6B:
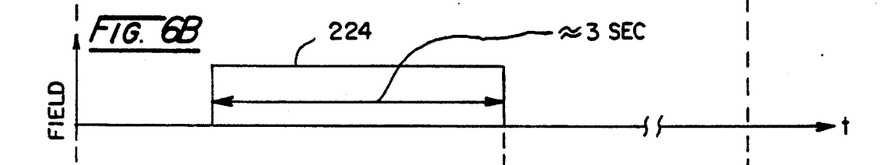
Figure 6C:
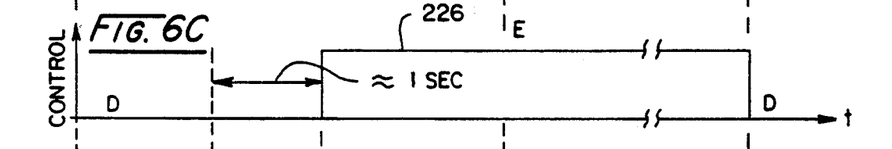

The illustrated arrangement of RC time constant circuits provides generation of a substantially instantaneous output signal 224 by the comparator 208 until the capacitor 212 can charge through the potentiometer 214; and, a delayed output signal 226 from the comparator 210 until the capacitor 216 can charge through the potentiometer 218, see FIGS. 6B and 6C. The output signal 224 from the comparator 208 drives a transistor 228 which is connected between an ignition, I, input of the integral alternator regulator 202 and a resistor 230 which is connected to receive power from a contact of the ignition switch 232. The transistor 228 causes the integral alternator regulator 202 to interrupt the field current of the armature, FI, of the alternator 100 for speed changes from the second low speed of alternator operation to the first high speed of alternator operation as will be fully described hereinafter.

Figure 6D:
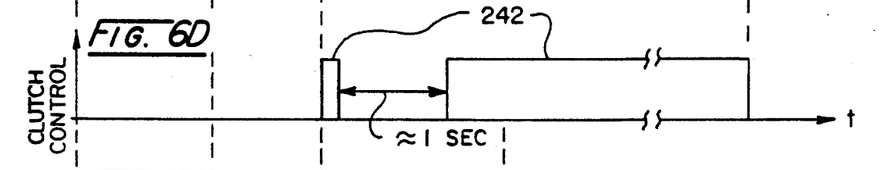

The output signal 226, also referred to herein as a control signal, from the comparator circuit 210 is passed to and operates the circuitry of FIG. 3. The output signal 226 activates a transistor 234 which causes full battery voltage VB+ to be applied to a control coil 130C of the electrical clutch 130. Current flow is through the coil 130C, a transistor 236 which is turned on by an inverter 238 which inverts the signal on the Q output of a timer circuit 240 generally identified as and comprising a 555 integrated timer circuit in the illustrated embodiment, the transistor 234 and a low resistance current monitoring resistor 241. The signal 242 of FIG. 6D is representative of activation of both transistors 234 and 236, i.e. the signal 242 is high if both the transistors 234 and 236 are turned on and is low if either or both of the transistors 234 and 236 are turned off.

Figure 6E:
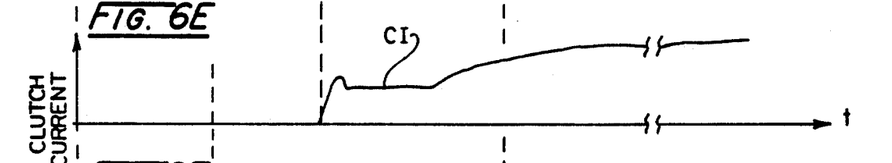
Figure 6F:
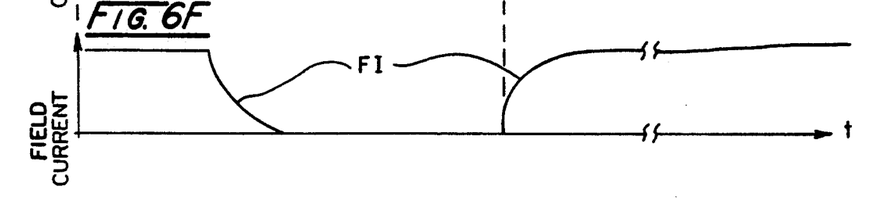

Current flow, C1, through the coil 130C is shown in FIG. 6E and is monitored by the resistor 241 and an operational amplifier 244. The operational amplifier 244 acts as a peak detector with the voltage level on a capacitor 246 being representative of the peak current through the coil 130C. As shown in FIG. 6E, the current flow, C1, through the coil 130C rises to a peak value and then suddenly drops as the clutch plate 128 is pulled in by the electrical clutch 130. Current flow, C1, through the coil 130C falling to approximately 70% of the peak value as represented by the voltage level on the capacitor 246 signals clutch pull-in and the timer circuit 240 is activated through the comparator 248.

The timer circuit 240 turns off the transistor 236 for a period of time defined by the timer circuit 240 and then the transistor 236 is turned back on. During the time period that the timer circuit 240 turns off the transistor 236, a voltage regulator circuit 250 controls current flow through the coil 130C. The voltage regulator circuit 250 acts to maintain a constant voltage across a resistor 252 such that a constant current flow is maintained through the coil 130C during this time. The voltage regulator circuit 250 comprises a LM337BT in the illustrated embodiment, which is commercially available from National Semiconductor, although other commercially available devices and circuits can be used in the present invention.

Operation of the clutch control circuit 200 for controlling a two speed alternator will now be described with reference to the drawing figures and particularly FIGS. 6A–6F. Operation will be described initially for a transition from operation at the second or low speed of operation for the alternator to the first or high speed of operation. Such a transition would occur for example if a motor vehicle including the alternator was stopped from operation at normal highway speeds. At normal highway speeds, the low speed of operation of the alternator is adequate to provide power for the electrical system of the motor vehicle and the frequency of this power is above 180 hertz corresponding to an alternator speed of 1800 RPM and an engine speed of 850 RPM. Accordingly, the frequency to voltage converter 206 generates a disengage, D, signal as its output signal 207.

As the vehicle slows, the engine speed goes below 850 RPM and the frequency of the output power from the alternator goes below 180 hertz. The reduced frequency of the output power from the alternator is detected by the frequency to voltage converter 206 which then changes its output signal 207 to a high voltage level or engage, E, signal. This results in the field current, FI, in the alternator being turned off by turning off the transistor 28, see FIG. 6F. It is currently preferred to turn off the field current, FI, for a period of approximately three (3) seconds. By turning off the field current, of the armature FI, for this brief period of time, the mechanical load on the alternator drive shaft 102 is reduced to a minimum.

After a delay period determined by the comparator 210 as described above, its output signal 226 or the control signal goes to a high voltage level or engage, E, signal. It is currently preferred to set the delay time to approximately one (1) second to permit the field current, FI, to decay prior to commencing engagement of the electrical clutch 130.

Clutch engagement is performed by initially applying substantially full battery voltage to the clutch coil 130C through the transistors 234 and 236 as described and illustrated in FIG. 6D. The initial pull-in of the clutch plate 128 is sensed and activates the timer 240 to turn off the transistor 236 for a period of time during which current flow through the clutch coil 130C is limited by the voltage regulator circuit 250 as described. The initial clutch pull-in is sensed by a dip in the clutch current as shown in FIG. 6E.

It is presently preferred to turn off the transistor 236 for a period of approximately one (1) second and to the control the current flow to approximately one (1) ampere. During this time period, the electrical clutch 130 is only partially engaged to allow slippage as the alternator drive shaft 102 is accelerated from its low speed of operation toward its high speed of operation. The transistor 236 is then turned back on to fully engage the electrical clutch 130. After the three (3) second turn off period, the field current, FI, for the alternator is turned back on via the transistor 228 and operation of the alternator continues in its first high speed.

Switching from the first high speed to the second low speed is performed as the frequency of the output power from the alternator increases to and exceeds 510 hertz, for example by a return of the motor vehicle to operation at normal high speeds. For transitions from high speed to low speed, the clutch is released and the clutch control circuit 200 is prepared for the next transition from low speed to high speed.

Having thus described the method and apparatus of the present invention in detail and by reference to preferred embodiments thereof, it will be apparent that modifications and variations are possible without departing from the scope of the invention defined in the appended claims.

What is claimed is:

1. A method of operating an alternator having a gear train interconnected between a pulley driven by an internal combustion engine and an armature of said alternator, said gear train being operable between two speeds by an electrical clutch which is engaged for operation of said alternator at a first one of said two speeds and disengaged for operation of said alternator at a second one of said two speeds, said method comprising the steps of:
   initially engaging said electrical clutch to operate said gear train and thereby said alternator at said first one of said two speeds;
   monitoring the frequency of electrical energy generated by said alternator circuit;
   disengaging said electrical clutch to operate said gear train and thereby said alternator at said second one of said two speeds as the frequency of electrical energy generated by said alternator increases to and exceeds a first predefined frequency; and
   re-engaging said electrical clutch to operate said gear train and thereby said alternator at said first one of said two speeds as the frequency of electrical energy generated by said alternator falls to and below a second predefined frequency less than said first predefined frequency by performing the steps of:
      defining a clutch slip time period;
      limiting current flow to said electrical clutch during said clutch slip time period to thereby partially engage said electrical clutch and accelerate said armature from said second one of said two speeds toward said first one of said two speeds; and
      fully activating said electrical clutch after said clutch slip time period to fully engage said electrical clutch and operate said alternator at said first one of said two speeds.

2. A method of operating an alternator having a gear train interconnected between a pulley driven by an internal combustion engine and an armature of said alternator, said gear train being operable between two speeds by an electrical clutch which is engaged for operation of said alternator at a first one of said two speeds and disengaged for operation of said alternator at a second one of said two speeds, said method comprising the steps of:
   initially engaging said electrical clutch to operate said gear train and thereby said alternator at said first one of said two speeds;
   monitoring the frequency of electrical energy generated by said alternator circuit;
   disengaging said electrical clutch to operate said gear train and thereby said alternator at said second one of said two speeds as the frequency of electrical energy generated by said alternator increases to and exceeds a first predefined frequency;
   re-engaging said electrical clutch to operate said gear train and thereby said alternator at said first one of said two speeds as the frequency of electrical energy generated by said alternator falls to and below a second predefined frequency less than said first predefined frequency;
   turning off alternator field current prior to performing the step of re-engaging said electrical clutch; and turning said alternator field current back on after said electrical clutch is engaged.

3. A method of operating an alternator as claimed in claim 2 further comprising the step of: delaying performance of the step of re-engaging said electrical clutch for an alternator current decay time period after performing the step of turning off alternator field current.

4. A method of operating an alternator as claimed in claim 3 wherein the step of re-engaging said electrical clutch comprises the steps of:
defining a clutch slip time period;
limiting current flow to said electrical clutch during said clutch slip time period to thereby partially engage said electrical clutch and accelerate said armature from said second one of said two speeds toward said first one of said two speeds; and
fully activating said electrical clutch after said clutch slip time period to fully engage said electrical clutch and operate said alternator at said first one of said two speeds.

5. A method of operating an alternator as claimed in claim 3 wherein the step of re-engaging said electrical clutch comprises the steps of:
applying activation power to said clutch;
sensing initial clutch pull-in;
defining a clutch slip time period commencing upon initial clutch pull-in;
limiting current flow to said electrical clutch during said clutch slip time period to thereby partially engage said electrical clutch and accelerate said armature from said second one of said two speeds toward said first one of said two speeds; and
fully activating said electrical clutch after said clutch slip time period to fully engage said electrical clutch and operate said alternator at said first one of said two speeds.

6. A method of operating a two speed alternator having a stator and an armature, said method comprising the steps of:
monitoring the frequency of electrical energy generated by said alternator;
operating said alternator at a first speed of its two speeds for frequencies of electrical energy ranging from zero up to a first predefined frequency;
operating said alternator at a second speed of its two speeds for frequencies of electrical energy from a maximum frequency down to a second predefined frequency, said second speed being less than said first speed and said first predefined frequency being greater than said second predefined frequency with the difference between said first predefined frequency and said second predefined frequency defining a hysteresis band for switching between said first and second speeds;
switching the operating speed of said alternator from said second speed to said first speed as the frequency of electrical energy falls below said second predefined frequency; and
temporarily interrupting field current flow in the armature of said alternator during a speed increasing time period preceding and extending into an initial time period of the step of switching from said second speed to said first speed.

7. A method of operating a two speed alternator as claimed in claim 6 wherein the step of switching the operating speed of said alternator from said second speed to said first speed comprises the step of gradually increasing the operating speed of said alternator from said second speed to said first speed.

8. An alternator driven by an internal combustion engine of a motor vehicle, said alternator comprising:
an alternator housing;
stator circuit means within said housing for conducting electrical energy from said alternator;
armature circuit means mounted for rotation within said housing;
drive means for transmitting energy from said internal combustion engine to said alternator;
gear means connected between said drive means and said armature circuit means for driving said armature circuit means at two speeds defined by said gear means;
clutch means connected to said gear means for switching between said two speeds;
circuit means connected to said stator circuit means for monitoring the frequency of electrical energy generated by said alternator and for controlling said clutch means to switch between said two speeds of said gear means dependent on the frequency of electrical energy generated by said alternator, said circuit means comprising current limiter means for limiting current flow to said clutch means and frequency monitoring means for monitoring electrical energy from said stator circuit means to generate a clutch state signal commanding clutch engagement for frequencies from zero up to a first predefined frequency and a clutch state signal commanding clutch disengagement for frequencies from a maximum frequency down to a second predefined frequency, said second predefined frequency being less than said first predefined frequency with the difference between said first and second predefined frequencies defining a hysteresis band for switching between said two speeds.

9. An alternator driven by an internal combustion engine of a motor vehicle as claimed in claim 8 wherein said circuit means further comprises clutch activation delay means for delaying engagement of said clutch means for a predefined time period in response to said clutch state signal commanding clutch engagement.

10. An alternator driven by an internal combustion engine of a motor vehicle as claimed in claim 9, wherein said circuit means further comprises field current control means for interrupting the field current to said armature circuit means for a predefined time period in response to said clutch state signal commanding clutch engagement.

11. An alternator driven by an internal combustion engine of a motor vehicle as claimed in claim 10 wherein said circuit means further comprises clutch monitoring means for detecting initial clutch pull-in and activating said current limiter means in response to detection of initial clutch pull-in.

* * * * *